Feb. 18, 1941.  E. W. WEBB  2,232,576
BRAKE BEAM SAFETY DEVICE
Filed April 28, 1939   3 Sheets-Sheet 1
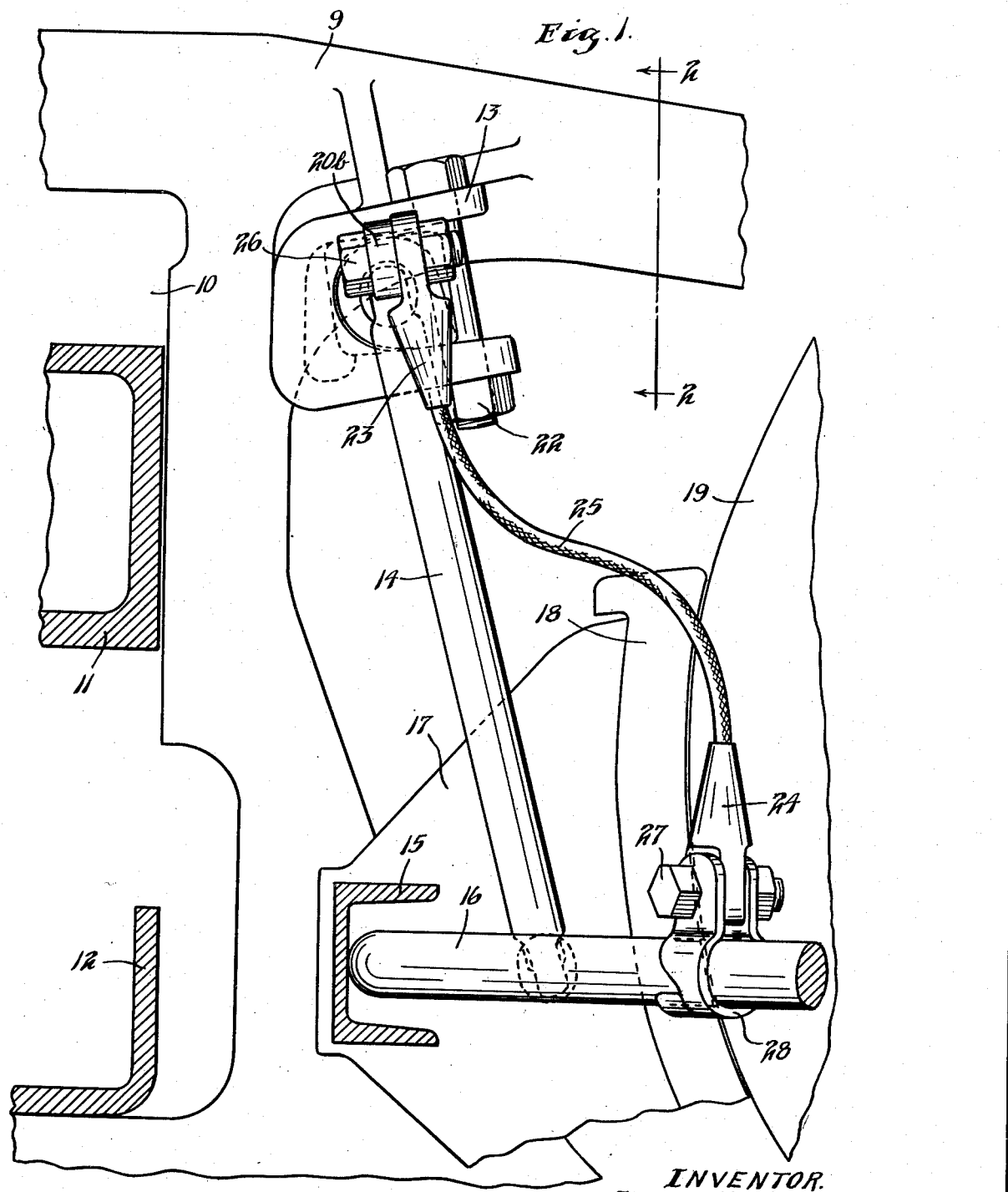
INVENTOR.
EDWIN W. WEBB.
BY HIS ATTORNEYS.
Williamson & Williamson

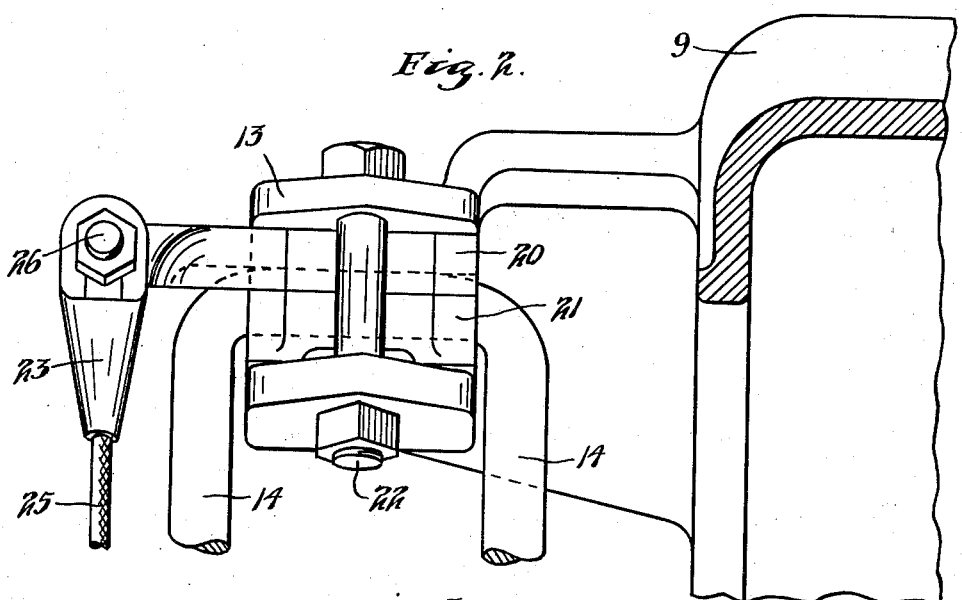

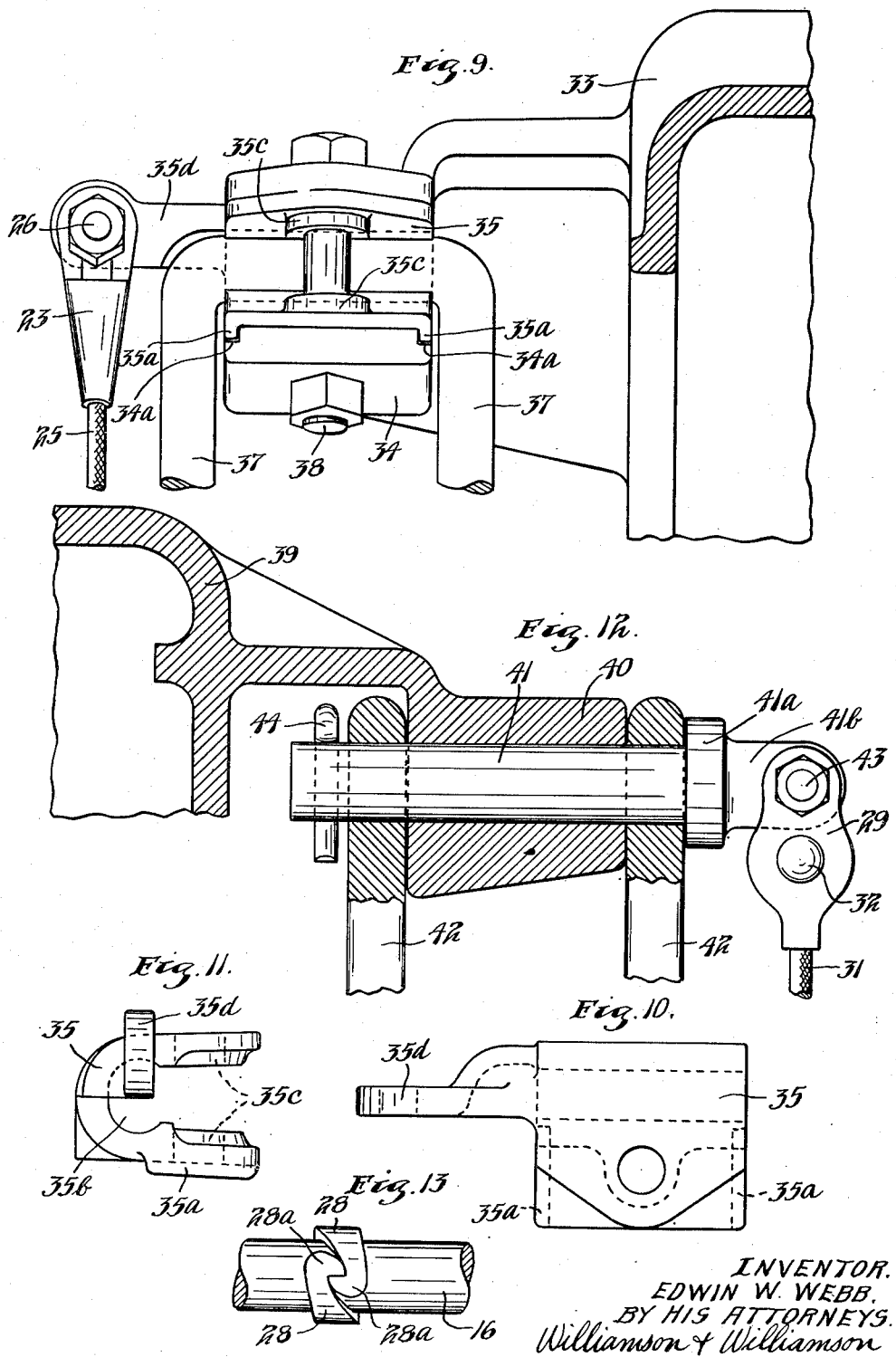

Patented Feb. 18, 1941

2,232,576

UNITED STATES PATENT OFFICE 2,232,576

BRAKE BEAM SAFETY DEVICE

Edwin W. Webb, Chicago, Ill., assignor to Standard Car Truck Company, Chicago, Ill., a corporation of New Jersey Application April 28, 1939, Serial No. 270,501

3 Claims. (Cl. 188—210)

This invention relates to brake beam safety devices for car trucks.

It is the general object of this invention to provide a novel and improved brake beam safety device of cheap and simple construction which will be effective to support the brake beam and prevent it from dropping in case of failure or breakage of the regular supports for the brake beam.

The objects and advantages of the present invention will more fully appear from the following description made in connection with the accompanying drawings wherein like reference characters refer to the same or similar parts throughout the various views and in which, Fig. 1 is a view in vertical longitudinal section through a portion of a car truck looking toward the inner side of a side frame of the truck, the truck being equipped with a brake beam safety device embodying the invention;

Fig. 2 is a vertical section taken on the line 2—2 of Fig. 1 as indicated by the arrows;

Fig. 3 is a detail showing the hanger bracket bushing;

Fig. 4 is a section taken on the line 4—4 of Fig. 3 as indicated by the arrows;

Fig. 5 is a plan view of the safety device disconnected;

Fig. 6 is a view in side elevation of the same;

Fig. 7 is a view similar to Fig. 5 of an alternative form of the safety device that can be employed;

Fig. 8 is a view in side elevation of one end portion of the device shown in Fig. 7;

Fig. 9 is a view similar to Fig. 2 but showing the use of an alternative form of brake hanger bracket bushing that may be employed;

Fig. 10 is a plan view of the bushing shown in Fig. 9;

Fig. 11 is a view in side elevation of the bushing shown in Figs. 9 and 10;

Fig. 12 is a transverse vertical section taken through a portion of a side frame and brake hanger bracket showing a slightly different type of brake hanger and brake hanger support and also showing a safety device illustrated in Figs. 7 and 8; and Fig. 13 is a view looking upward toward the underside of the anchoring clip as it is applied.

Referring to the drawings, Figs. 1, 2, 3, 4, 5, 6 and 13, portions of a car truck are showing including a side frame 9 having a bolster opening 10 within which a bolster 11 works. A spring plank 12 is also shown. Formed at the inner side of the compression member of the side frame, is a brake hanger bracket 13 of standardized type. A brake beam hanger 14 is supported from this brake hanger bracket 13 and it in turn supports one end of the brake beam which includes the brake beam compression member 15 and brake beam tension member 16. The brake beam carries brake heads 17 equipped with brake shoes 18, which of course work against the car wheels 19.

To support the hanger 14 from the brake hanger bracket 13 and prevent wear on the inside of the bracket by the hanger, a split bushing consisting of the two parts 20 and 21 is provided. The two sections 20 and 21 of the bushing have semi-cylindrical cross recesses therein to receive the brake beam hanger 14 and the two bushing sections also have notches 20a and 21a which can be brought into alignment to take a portion of a nutted bolt 22 for securing the bushing in place within the brake hanger bracket 13. It will be noted that the lower surface of the bushing section 21 is inclined to fit against the inclined lower jaw of the brake hanger bracket 13 and it will also be noted that the upper section 20 of the bushing is provided with two notches 20a, either one of which can be alined with the one notch 21a in the lower bushing section 21 to thereby avoid the necessity of making the upper bushing section 20 in rights and lefts for use at opposite sides of the truck. The upper bushing section 20 forms a short arm 20b which projects inwardly from side frame 9 slightly relative to the hanger 14 and this arm terminates in a flattened and apertured ear to form a support for the brake beam safety device of the invention. The arm 20b extends inwardly from the bushing section 20 wherein the semi-cylindrical recess is formed.

The safety device proper in the form shown in Figs. 1 to 6, and as also shown in Fig. 9, includes a pair of slotted lugs 23 and 24 of similar structure and a flexible steel cable 25 integrally connected at its two ends as by welding to the respective lugs 23 and 24. The lugs 23 and 24 are provided with openings therein wherein the ends of the cable 25 are received and after the cable ends are placed within the openings of the lugs they are preferably welded or soldered in place.

The upper lug 23 of the safety device proper is connected by a nutted bolt 26 to the apertured ear of the arm 20b forming a portion of the upper section of the bushing carried by the brake hanger bracket 13. The lower lug 24 is connected by a nutted bolt 27 to an anchoring clip 28 attached to a portion of the brake beam such as to one of the tension members 16 thereof. This anchoring clip as shown in Figs. 1 and 13, to permit of ready connection and disconnection with a tension member 16, consists of a pair of clamping jaws which clamp against the tension member 16 of the brake beam and these jaws are provided at their lower ends with interlocking teeth 28a. The one nutted bolt 27 acts both to connect the clip 28 to the tension member 16 as well as to connect the lug 24 to the clip. The cable 25 of the safety device is of such length relative to the spacing between the brake hanger bracket 13 and the point where the clip 28 is attached to the brake beam that the cable 25 will not be taut when the brake beam is properly supported by the hanger 14. In other words, the safety device consisting of the cable 25 and lugs 23 and 24 is of somewhat greater length than the distance between the arm 20b and the clip 28 so that the brake beam is not normally supported by the safety device. In case of breakage of the hanger 14, or of any other part which functions to support the brake beam, the safety device will act to support the brake beam and prevent it from dropping to obviate any possibility of accident through derailment or the like. The use of the flexible cable 25 is highly desirable because of the fact that the cable will not rattle as would a chain or other link structure and also the cable 25, if originally bent as shown in Fig. 1 to substantially an S formation, will have some resiliency to remain in that formation.

In Figs. 7 and 8 and in Fig. 12 an alternative form of safety device is shown which can be substituted for the safety device shown in the other views consisting of the parts 23, 24 and 25. In the device shown in Figs. 7, 8 and 12, lugs 29 and 30 are employed in place of the lugs 23 and 24 respectively. Lugs 29 and 30 consist of split casings within which the looped ends of a cable 31 are received and rivets 32 hold the two sections of the casings together and securely anchor the cable ends to the lugs. The lugs 29 and 30 are equipped with bolt holes to receive the bolts 26 and 27.

In Figs. 9, 10 and 11 an alternative form of bushing for connection of the brake hanger to the brake hanger bracket and for support of the brake beam safety device is shown. Referring to these views a side frame is designated by the numeral 33 and this side frame carries a brake beam hanger bracket 34, the upper surface of the under jaw of which is preferably provided with side rabbets 34a. A bushing 35 is provided for reception in the hanger bracket 34. The portion of this bushing received within the bracket 34 is of substantially U-shape in side elevation as best shown in Fig. 11 and the bottom portion of the bushing is provided with downwardly extending flanges 35a which are received within the rabbets 34a of the bracket 34. The bushing has a C-shape recess 35b within which the top cross portion of the brake hanger 37 is received and the bushing is also provided with bossed bolt openings 35c which receive a nutted bolt 38 carried by the bracket 34. This bolt secures the bushing 35 to the bracket 34 and retains the brake hanger 37 in place within the bushing. By removing this bolt 38 both the brake hanger 37 and the bushing 35 can be removed from the bracket 34. The bushing 35 carries an inwardly projecting arm 35d provided at its inner end with an apertured ear to which the upper lug 23 of a safety device is secured as by a nutted bolt 26. It will, of course, be understood that the safety device shown in Figs. 5 and 6, or the safety device shown in Figs. 7 and 8, can be attached to the arm 35d. The bushing 35 shown in Figs. 9, 10 and 11 will be made in rights and lefts to fit on opposite sides of the truck.

Referring to Fig. 12 there is shown a side frame 39 having a brake hanger bracket 40 consisting of merely an apertured hub integrally connected therewith. A pin 41 is received within the bracket 40 and a brake hanger 42 having at its upper end two spaced arms provided with eyes is carried by the pin 41, the eyes of the arms of the brake hanger receiving the pin 41. The inner end of the pin 41 is provided with a head 41a from which extends an apertured lug 41b to which the safety device proper is connected. In Fig. 12 a safety device of the type shown in Figs. 7 and 8 is shown connected to the pin 41, the upper lug 29 of this device being secured to the lug 41b lug of the pin as by a nutted bolt 43. Unintentional withdrawal of the pin 41 from the bracket 40 is prevented by means of a cotter key 44 which runs through an opening in the outer end portion of the pin 41.

In connection with the devices shown in Figs. 1, 2, 3 and 4, and Figs. 9, 10 and 11, attention should be called to the fact that the bolt 22, or 38, as the case may be, which holds the bushing employed in place also holds the brake beam hanger in place. Accordingly when such a bolt is removed the bushing employed therewith may be removed from the brake hanger bracket and the top end of the cable forming the brake beam safety device is released at the same time. Thus the brake beam safety device is removed simultaneously with the brake beam hanger and considerable labor is saved when it becomes desirable to remove the brake beam over what would be the case if the safety device was not removable with the bushing. Also in connection with the device shown in Fig. 12 removal of the cotter key 44 permits removable of the brake beam hanger 42 and at the same time disconnects the brake beam safety device from the side frame.

The anchoring clip 28 is, of course, very easily removed from the brake beam by merely removing the bolt 27.

It will be seen that I have provided an extremely simple and practical brake beam safety device which is effective for the use intended.

It will, of course, be understood that various changes may be made in the form, details, arrangement and proportions of the various parts without departure from the scope of the present invention which generally stated consists of the matter shown and described and set forth in the appended claims.

What is claimed is:

1. In a car truck, a brake hanger bracket, a brake hanger bushing mounted in said bracket and having an arm projecting laterally inwardly therefrom, a brake beam hanger supported in said bushing, a brake beam carried by said hanger and a flexible member of slightly greater length than the spacing between said arm and said brake beam and connected at its upper end to said arm and at its lower end to said brake beam.

2. The structure defined in claim 1, said member comprising a pair of lugs and a cable connected at its ends to said lugs.

3. In a car truck, a bushing for brake hanger brackets comprising means for receiving and carrying the brake hanger and a projecting arm for attachment of a flexible cable which may be extended to the brake beam.

EDWIN W. WEBB.